(12) United States Patent
Maheshwari et al.

(10) Patent No.: US 7,624,335 B1
(45) Date of Patent: Nov. 24, 2009

(54) VERIFYING A FILE IN A SYSTEM WITH DUPLICATE SEGMENT ELIMINATION USING SEGMENTION-INDEPENDENT CHECKSUMS

(75) Inventors: Umesh Maheshwari, San Jose, CA (US); R. Hugo Patterson, Mountain View, CA (US)

(73) Assignee: Data Domain, Inc., Santa Clara, CA (US)

( * ) Notice: Subject to any disclaimer, the term of this patent is extended or adjusted under 35 U.S.C. 154(b) by 545 days.

(21) Appl. No.: 11/251,627

(22) Filed: Oct. 13, 2005

(51) Int. Cl.
*G06F 11/00* (2006.01)

(52) U.S. Cl. .............................. 714/807; 714/6; 714/15; 714/758; 714/805

(58) Field of Classification Search .................... 714/6, 714/15, 758, 799, 805, 807
See application file for complete search history.

(56) References Cited

U.S. PATENT DOCUMENTS 5,838,963 A * 11/1998 Griffiths ........................ 707/6
6,738,932 B1 * 5/2004 Price ............................ 714/38

* cited by examiner

*Primary Examiner*—Esaw T Abraham
(74) *Attorney, Agent, or Firm*—Van Pelt, Yi & James LLP

(57) ABSTRACT

Verifying a file in a system with duplicate segment elimination is disclosed. A data file is segmented into a plurality of distinct data segments, and a checksum is computed for each of the plurality of distinct data segments. A constructed data file checksum is constructed from the checksums of each of the plurality of distinct data segments, and, it is determined if a checksum of the data file is the same as the constructed data file checksum.

28 Claims, 3 Drawing Sheets

Data Segments for a File = a b a b c d e f a

VERIFYING A FILE IN A SYSTEM WITH DUPLICATE SEGMENT ELIMINATION USING SEGMENTION-INDEPENDENT CHECKSUMS

BACKGROUND OF THE INVENTION

Some data storage systems avoid storing duplicate data segments to use the available storage space more efficiently. This is particularly applicable for backup systems. A data set of data files is transmitted from a source system to a storage system. At some point, data files in the data set are broken into segments. To make storage more efficient, a reduced number of copies of a segment that appears multiple times in a data set are stored in the storage system along with location information indicating how to reconstruct the original data files in the data set. There are points in the segmenting, transmission, and other processing steps of the files in the data set where corruption can occur. However, traditional means of verifying a data file would require reconstructing the file from the data segments. It would be valuable if it could be determined efficiently that no corruption has occurred so that the data files in the data set could be recovered without any errors.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Verifying a file in a system with duplicate segment elimination using segment-independent checksums is disclosed. A checksum is computed for a data file. In some embodiments, the data file and the data file checksum are transmitted from a source system and received at a storage system. The data file is segmented into a plurality of distinct data segments and checksums are computed for each of the distinct data segments. The segment checksums are used to construct a data file checksum. The original data file checksum and the constructed data file checksum from the checksums of each of the segments are compared. If the data file checksum and the constructed data file checksum are the same, then the data file and the plurality of distinct data segments is determined to be equivalent. The data file can therefore be reconstructed from the plurality of distinct data segments without fear of corruption.

Figure 1:
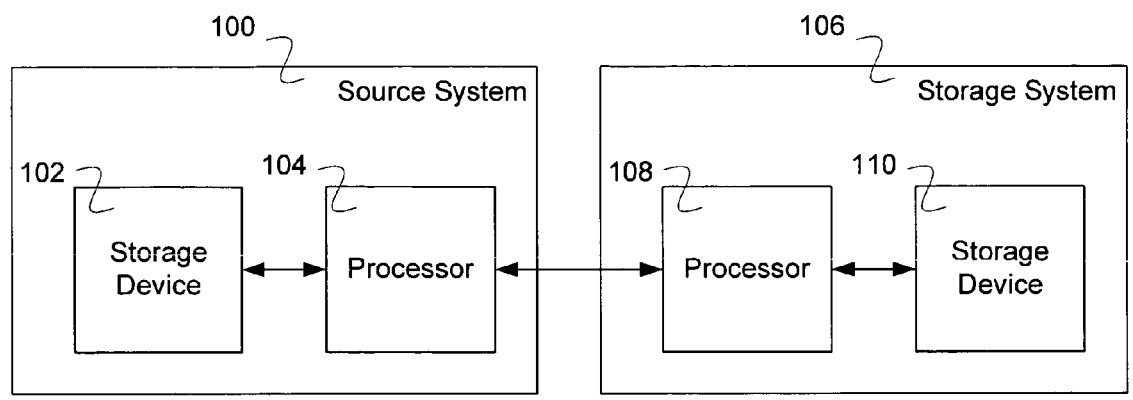
FIG. 1 illustrates a system verifying a file in a system with duplicate segment elimination using segment-independent checksums in one embodiment.

FIG. 1 illustrates a system verifying a file in a system with duplicate segment elimination using segment-independent checksums in one embodiment. In the example shown, source system 100 includes storage device 102 and processor 104. Storage system 106 includes processor 108 and storage device 110. Source system 100 is the source of information that is to be stored on storage system 106. Source information from storage device 102 is processed by processor 104 and transmitted to storage system 106. The processed source information is received by storage system 106 and processed by processor 108 before being stored on storage device 110. In various embodiments, storage device 102 and storage device 110 include a plurality of storage devices. Storage device 102 and storage device 110 can be a magnetic hard drive, a redundant array of magnetic hard drives, a tape drive, an optical drive, a flash drive or any other storage device for storing digital information. In various embodiments, source system 100 and/or storage system 106 comprise one or more separate computer systems with one or more separate processors. In various embodiments, source information from source system 100 is transmitted to storage system 106 using a direct connection, a local network connection, a wide area network connection, a wireless network connection, the internet, or any other connection able to appropriately transmit the information.

Figure 2:
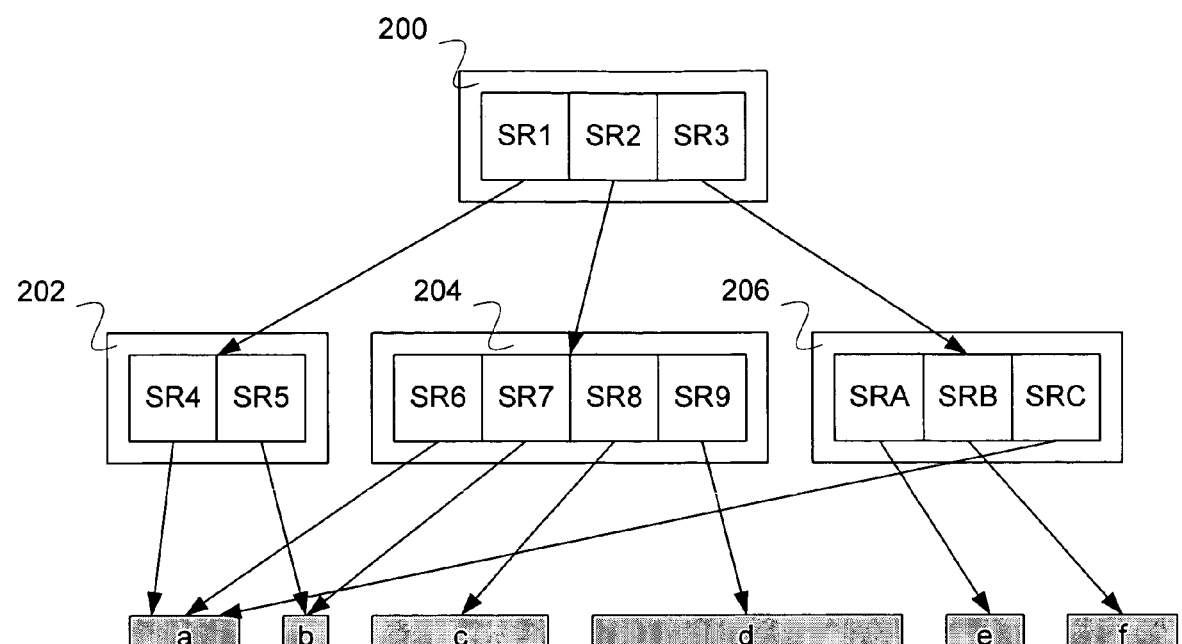
FIG. 2 illustrates location information on the storage system storage device in one embodiment.

FIG. 2 illustrates location information on the storage device in one embodiment. In the example shown, a tree is used to locate segments in a data file. The data file includes data segments 'a,' 'b,' 'a,' 'b,' 'c,' 'd,' 'e,' 'f,' and 'a.' Top tree segment 200 includes three segment references SR1, SR2, and SR3. Each segment reference includes information such as the content derived identifier, the checksum for the segment, and the logical size of the segment. In some embodiments, the content derived identifier is a cryptographic hash function, and the checksum is a composable hash function. Each segment reference of top tree segment 200 (for example, SR1, SR2, and SR3) refers to another segment (for example tree segment 202, 204, and 206, respectively). Tree segment 202 includes two segment references SR4 and SR5. Segment reference SR4 refers to data segment 'a' and segment reference SR5 refers to data segment 'b.' Tree segment 204 includes four segment references SR6, SR7, SR8, and SR9. Segment references SR6, SR7, SR8, and SR9 refer to data segments 'a,' 'b,' 'c,' and 'd,' respectively. Tree segment 206 includes four segment references SRA, SRB, and SRC. Segment references SRA, SRB, and SRC refer to data segments 'e,' 'f,' and 'a,' respectively. In some embodiments, the B-tree is used to locate data files in a data set and/or segments in a data file efficiently at arbitrary offsets. In some embodiments, the checksums for data segments and groups of data segments associated with tree segments are computed as the tree is built using the checksums for each data segment.

A hash function takes a long string (or message) of any length as input and produces a fixed length string as output. A cryptographic hash function is a hash function suitable for use as an identifier for data segments in a deduplication system because of their collision resistant properties. A cryptographic hash function typically has properties including 1) given h, it should be hard to find m such that h=hash(m); 2) given m1, it should be hard to find m2 (not equal to m1) such that hash(m1)=hash(m2); and 3) it should be hard to find two different m1 and m2 such that hash(m1)=hash(m2). Cryptographic hash functions include SHA-1 (Secure Hash Algorithm 1), MD5 (Message-Digest algorithm 5), and RIPEMD-160 (RACE Integrity Primitives Evaluation Message Digest 160-bit version). In some embodiments, the identifier is a similar to identifiers as described in U.S. patent application Ser. No. 10/611,309 by Patterson entitled: "DATA STORAGE USING IDENTIFIERS" which is incorporated by reference for all purposes.

Hash functions include 1-byte XOR, redundancy checks (for example, Fletcher's checksum, Adler-32, and cyclic redundancy checks), byte-wise sums, a Rabin fingerprint, and Fowler-Noll-Vo (FNV) hash function. A composable hash function has the additional property that, given data file DATA which can be segmented into two segments data1 and data2 or two other segments data3 and data4, (i.e. DATA=data1.data2=data3.data4)

$$\begin{aligned} c\_hash(DATA) &= c\_hash\_compose(\ c\_hash(data1), length(data1), \\ & \qquad\qquad\qquad\qquad c\_hash(data2), length(data2)\ ) \\ &= c\_hash\_compose(\ c\_hash(data3), length(data3)) \\ & \qquad\qquad\qquad\qquad c\_hash(data4), length(data4)\ ) \end{aligned}$$

where c_hash is the composable hash function, c_hash_compose is the compose function for the composable hash function such that the composable hash of DATA can be computed from the composable hash of segments data1 and data2, and length is a function giving the length of the data segment. The composable function depends on the composable hash function. In various embodiments, the length of one or both of the data segments is not required for the composable function. Composable hash functions include 1-byte XOR, 4-byte XOR, byte-wise sum, and a Rabin fingerprint. For example, the hash function of a 4-byte XOR is a composable hash function. So, the relation between the 4-byteXOR function and the 4-byteXOR_compose function is given by For example, the hash function of a 1-byte XOR is a composable hash function. So, the relation between the 1_byteXOR function and the 1_byteXOR_compose function is given by $$\begin{aligned} 1\_byteXOR(DATA) &= 1\_byteXOR\_compose(\ 1\_byteXOR(data1), \\ & \qquad\qquad\qquad\qquad 1\_byteXOR(data2)\ ) \\ &= 1\_byteXOR\_compose(\ 1\_byteXOR(data3), \\ & \qquad\qquad\qquad\qquad 1\_byteXOR(data4)\ ) \end{aligned}$$

where the compose function is
1_byteXOR_compose(X1, L1, X2, L2)=X1^X2, where the composable hash function is
1_byteXOR(Y)=$Y_{byte1}$^$Y_{byte2}$^ ... ^$Y_{byteN}$, where $Y_{bytei}$ is the $i^{th}$ byte in Y, and where there are N bytes in Y.

Figure 3:
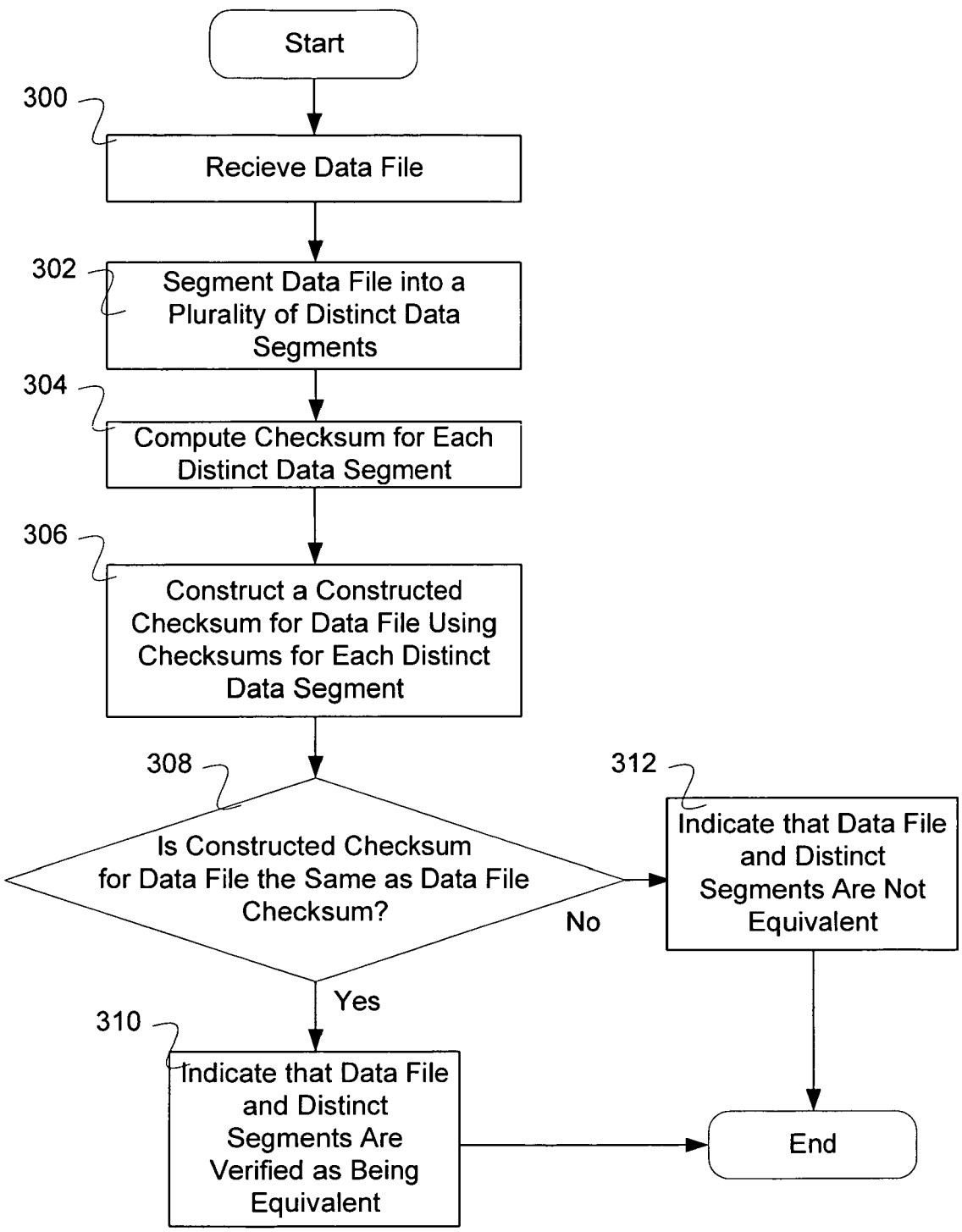
FIG. 3 illustrates an embodiment of a process for verifying a file in a system with duplicate segment elimination using segment-independent checksums.

FIG. 3 illustrates an embodiment of a process for verifying a file in a system with duplicate segment elimination using segment-independent checksums. In the example illustrated, a data file is received in 300. In 302, the data file is segmented into a plurality of distinct data segments. In 304, a checksum is computed for each of the plurality of distinct data segments. In 306, a constructed data file checksum is constructed using the checksums for each of the plurality of distinct data segments. Using the checksums for each distinct data segment to construct a data file checksum is more efficient than reconstructing the data file from the distinct data segments and then calculating the data file checksum. This is because the same distinct data segment may appear multiple times in the data set of data files. In some embodiments, the checksums for each distinct data segment are calculated only once and used to determine checksums for groups of data segments associated with tree segments or the entire data file.

In 308, it is determined if the constructed data file checksum is the same as the data file checksum. In various embodiments, the data file checksum is calculated before the data file is transmitted from the source system to the storage system, while the data file is streamed out of the source system, while the data file is being received at the storage system, or at any other appropriate point in time or in any other appropriate system. If the constructed data file checksum is the same as the data file checksum, then control is passed to 310. In 310, it is indicated that the data file and the plurality of distinct data segments are verified as being equivalent, and the process ends. If the constructed data file checksum is not the same as the data file checksum, then control is passed to 312. In 312, it is indicated that the data file and the plurality of distinct data segments are not equivalent, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

$$\begin{aligned} 4\_byteXOR(DATA) &= 4\_byteXOR\_compose(\quad 4\_byteXOR(data1), length(data1), \\ & \qquad\qquad\qquad\qquad\qquad\quad 4\_byteXOR(data2)\ ) \\ &= 4\_byteXOR\_compose(\quad 4\_byteXOR(data3), length(data3), \\ & \qquad\qquad\qquad\qquad\qquad\quad 4\_byteXOR(data4)\ ) \end{aligned}$$

where the compose function is
4_byteXOR_compose( X1, L1, X2, L2 ) = X1 ^ rotate( X2, (L1 mod 4) * 8)
and where the rotate function is
rotate( X, Y ) = ( X << Y ) | ( X >> 32 − Y ).

The invention claimed is:

1. A method for verifying a file in a system with duplicate segment elimination comprising:

segmenting a data file into a plurality of distinct data segments storing the data file in a data storage system, wherein storing the data file comprises checking to determine whether one or more of the plurality of distinct data segments is the same as a data segment that has been stored previously in the data storage system, and in the event that one of the plurality of distinct data segments is not the same as a segment already stored, storing the one of the plurality of distinct data segments, and in the event that one of the plurality of distinct data segments is the same as a data segment that has been stored previously in the data storage system, storing a reference to the data segment that has been stored previously in place of the one of the plurality of distinct data segments;

computing, using a processor, a checksum for each of the plurality of distinct data segments;

constructing a constructed data file checksum from the checksums of each of the plurality of distinct data segments; and determining if a checksum of the data file is the same as the constructed data file checksum.

2. A method as in claim 1, further including, in the event that the checksum of the data file is the same as the constructed data file checksum, indicating that the data file and the plurality of distinct data segments have been verified as being equivalent.

3. A method as in claim 1, wherein the checksum is a composable hash.

4. A method as in claim 1, wherein the checksum is a 1-byte XOR.

5. A method as in claim 1, wherein the checksum is a 4-byte XOR.

6. A method as in claim 1, wherein the checksum is a byte-wise sum.

7. A method as in claim 1, wherein the checksum is a Rabin fingerprint.

8. A method as in claim 1, wherein the checksum of the data file is computed by a source system.

9. A method as in claim 1, wherein the checksum of the data file is computed by a storage system.

10. A system for verifying a file in a system with duplicate segment elimination comprising:

a processor configured to:

segment a data file into a plurality of distinct data segments store the data file in a data storage system, wherein storing the data file comprises checking to determine whether one or more of the plurality of distinct data segments is the same as a data segment that has been stored previously in the data storage system, and in the event that one of the plurality of distinct data segments is not the same as a segment already stored, storing the one of the plurality of distinct data segments, and in the event that one of the plurality of distinct data segments is the same as a data segment that has been stored previously in the data storage system, storing a reference to the data segment that has been stored previously in place of the one of the plurality of distinct data segments;

compute a checksum for each of the plurality of distinct data segments;

construct a constructed data file checksum from the checksums of each of the plurality of distinct data segments; and determine if a checksum of the data file is the same as the constructed data file checksum; and a memory coupled to the processor and configured to provide instructions to the processor.

11. A system as in claim 10, wherein the processor is further configured to, in the event that the checksum of the data file is the same as the constructed data file checksum, indicate that the data file and the plurality of distinct data segments have been verified as being equivalent.

12. A system as in claim 10, wherein the checksum is a composable hash.

13. A system as in claim 10, wherein the checksum is a 1-byte XOR.

14. A system as in claim 10, wherein the checksum is a 4-byte XOR.

15. A system as in claim 10, wherein the checksum is a byte-wise sum.

16. A system as in claim 10, wherein the checksum is a Rabin fingerprint.

17. A system as in claim 10, wherein the checksum of the data file is computed by a source system.

18. A system as in claim 10, wherein the checksum of the data file is computed by a storage system.

19. A computer program product for verifying a file in a system with duplicate segment elimination, the computer program product being embodied in a computer readable storage medium and comprising computer instructions that when executed, cause a computer to perform the following:

segment a data file into a plurality of distinct data segments store the data file in a data storage system wherein storing the data file comprises checking to determine whether one or more of the plurality of distinct data segments is the same as a data segment that has been stored previously in the data storage system, and in the event that one of the plurality of distinct data segments is not the same as a segment already stored, storing the one of the plurality of distinct data segments, and in the event that one of the plurality of distinct data segments is the same as a data segment that has been stored previously in the data storage system, storing a reference to the data segment that has been stored previously in place of the one of the plurality of distinct data segments;

computing a checksum for each of the plurality of distinct data segments;

constructing a constructed data file checksum from the checksums of each of the plurality of distinct data segments; and determining if a checksum of the data file is the same as the constructed data file checksum.

20. A computer program product as recited in claim 19, the computer program product further comprising computer instructions for, in the event that the checksum of the data file is the same as the constructed data file checksum, indicating that the data file and the plurality of distinct data segments have been verified as being equivalent.

21. A computer program product as recited in claim 19, the computer program product further comprising computer instructions for receiving from a first system at a second system the data file and the secondary identifier of the data file.

22. A computer program product as recited in claim 19, wherein the checksum is a composable hash.

23. A computer program product as recited in claim 19, wherein the checksum is a 1-byte XOR.

24. A computer program product as recited in claim 19, wherein the checksum is a 4-byte XOR.

25. A computer program product as recited in claim 19, wherein the checksum is a byte-wise sum.

26. A computer program product as recited in claim 19, wherein the checksum is a Rabin fingerprint.

27. A computer program product as recited in claim 19, wherein the checksum of the data file is computed by a source system.

28. A computer program product as recited in claim 19, wherein the checksum of the data file is computed by a storage system.

* * * * *

UNITED STATES PATENT AND TRADEMARK OFFICE
CERTIFICATE OF CORRECTION

PATENT NO. : 7,624,335 B1  Page 1 of 1
APPLICATION NO. : 11/251627
DATED : November 24, 2009
INVENTOR(S) : Maheshwari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twenty-sixth Day of October, 2010

David J. Kappos
*Director of the United States Patent and Trademark Office*